Jan. 1, 1963 A. J. IRWIN 3,070,849
PORTABLE SEATING EQUIPMENT FOR CIRCUSES AND THE LIKE
Filed July 19, 1957 2 Sheets-Sheet 1
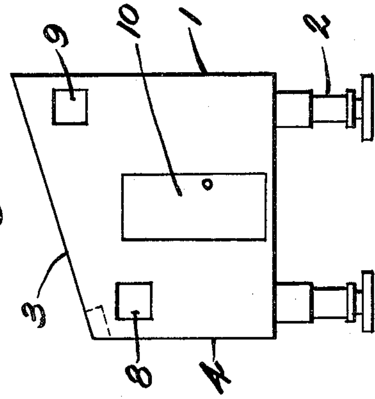
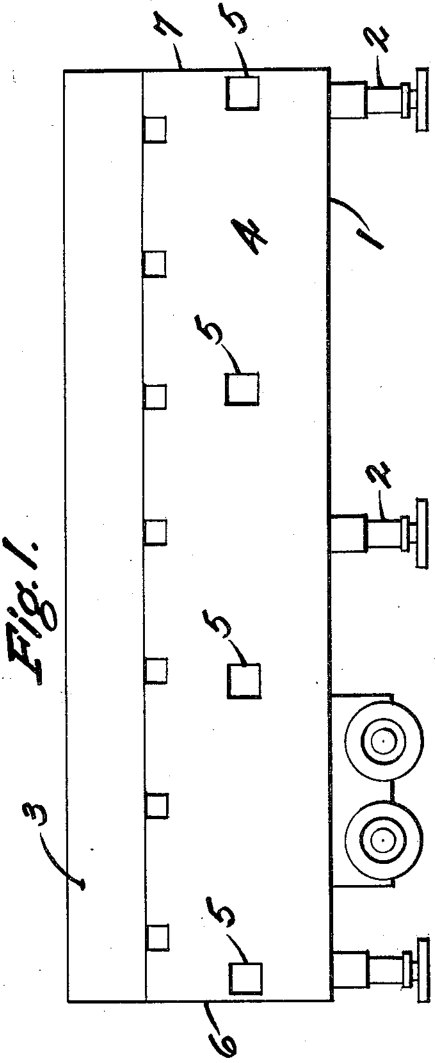
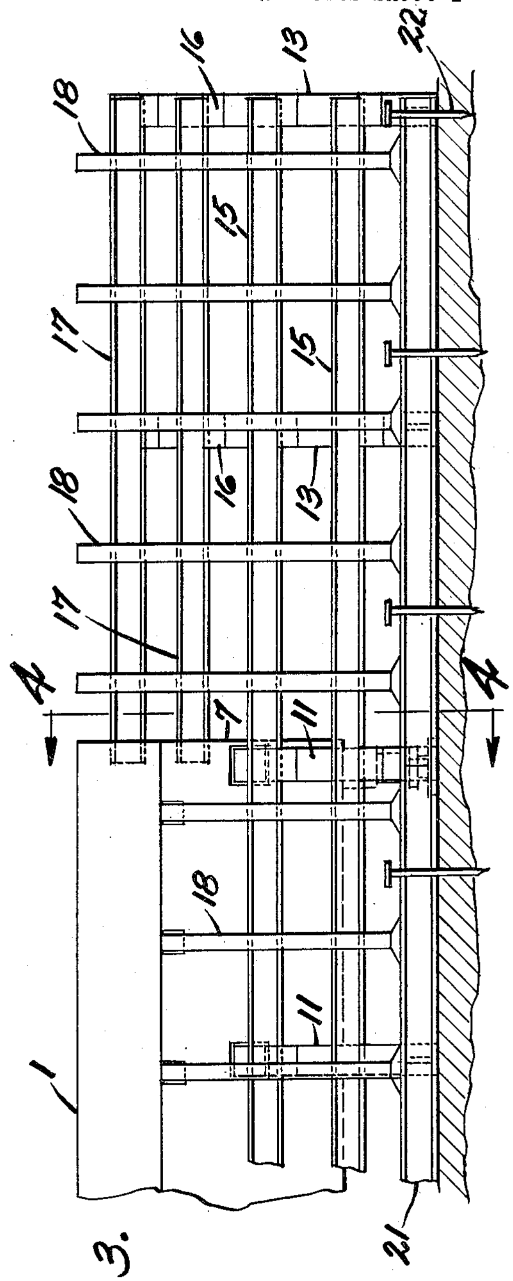
INVENTOR.
ALEXANDER J. IRWIN
BY PARKER & CARTER
ATTORNEYS PORTABLE SEATING EQUIPMENT FOR CIRCUSES AND THE LIKE
Filed July 19, 1957 2 Sheets-Sheet 2
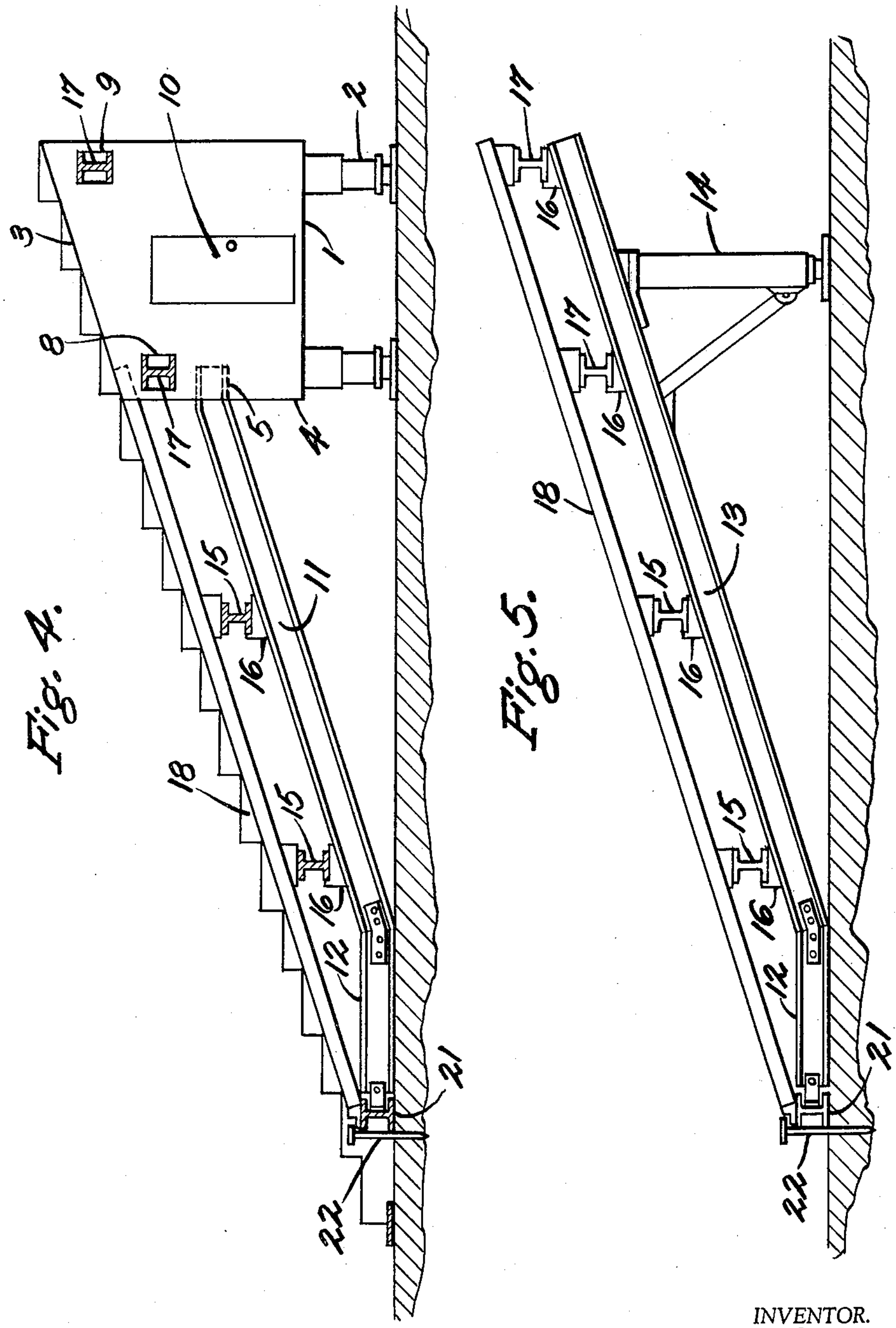
INVENTOR.
ALEXANDER J. IRWIN
BY PARKER & CARTER
ATTORNEYS United States Patent Office 3,070,849

Patented Jan. 1, 1963

1

3,070,849

PORTABLE SEATING EQUIPMENT FOR CIRCUSES AND THE LIKE

Alexander J. Irwin, 135 S. La Salle St., Chicago 3, Ill.

Filed July 19, 1957, Ser. No. 673,080

1 Claim. (Cl. 20—1.126)

My invention relates to improvements in portable seating equipment for circuses and the like and has for one object to provide a trailer or truck which will carry the grandstand structure, the flooring and the seats for a portable seat assembly.

Another object of my invention is to provide a structure where the wagon, truck or trailer body furnishes the anchorage, is located at the center, back or higher portion of the stand and gives stability to a structure which extends downwardly from one side of the truck and downwardly from such lateral extension so that the truck body is at the back of the stand and in the center and so furnishes stability to the structure on three sides therof and is at the same time available for use as storage, dressing room or the like.

Another object of my invention is a structure wherein the inclined structural members extending from back to front are supported at front and back only, thus making it safe and convenient to install even on irregular ground.

Other objects will appear from time to time in the specification and claim.

My invention is illustrated more or less diagrammatically in the accompanying drawings, wherein—

FIGURE 1 is a side elevation of the trailer itself;

FIGURE 2 is an end elevation of the trailer;

FIGURE 3 is a detail side elevation of the trailer with grandstand structural frame in place;

FIGURE 4 is a section along the line 4—4 of FIGURE 2 with parts omitted;

FIGURE 5 is an end view of the device of FIGURE 3.

Like parts are indicated by like characters throughout the specification and drawings.

The trailer body 1 has the usual supporting road wheels and when used as part of the grandstand is adapted to be supported on jacks 2 which give it adequate stability. The roof 3 is downwardly inclined as indicated in FIGURES 1 and 2 conforming to the inclination of the floor of the grandstand. The side wall 4 of the body supports a plurality of sockets 5 open to the outside. The front and back ends 6 and 7 of the body contain sockets 8 and 9. Access doors are open in the opposed side wall and as indicated at 10 in the front and end walls. The grandstand structure when disassembled is stored and transported inside the trailer body or if desired on the roof.

Referring to FIGURE 4, a plurality , in this case five, transverse downwardly inclined I-beams or foundation beams 11 are each socketed at their upper ends of one of the sockets 5 adapted to be bolted to generally horizontal extensions 12 which rest on theg round and so each beam 11 extends downwardly from the truck or trailer body and is supported at the ground level.

Referring to FIGURE 5, inclined beams 13 similar to but longer than the beams 11 extend parallel with the beams 11 and are supported on adjustable jacks 14 so that they take the same inclination and are spaced equally with respect to the beams 11. Cross beams 15 rest on cushions 16 on beams 11 and 13 and extend the entire width of the grandstand section associated with the truck body. Similar beams 17 rest on cushions 16 on the beams 11 and 13 but at their ends interlock with the sockets 8 and 9. Thus a grid comprising a plurality of beams perpendicular to the length of the trailer intersected by beams parallel with the axis of the trailer form a portable structure, the lengths of all the beams being such that when demounted they can be contained within the structure.

Extending in prolongation of the roof 3, carried by the beams 15 and 17 are stepped stringers 18 which can support floor boards and seats not illustrated so that the seating area is inclined from ground level upwardly to the top, back edge of the grandstand.

This structure may be clamped or bolted together in any suitable manner, the details of the holding means not being illustrated as they form no part of the present invention. The important thing is that the heavy, massive truck body when it is rigidly supported on the ground by the adjustable jacks can be leveled to provide a massive, central anchorage. Then the structural members may be taken out and assembled as indicated so that there is always a rigid tie up between the structural elements and the heavy truck body itself, thus inhibiting local displacement of the elements building up the grandstand and since the grandstand contacts the ground only adjacent the forward edge and adjacent the rear edge on both sides of the rigid truck body, maximum stability is accomplished with a minimum reference to level ground variation.

The members 12 which are in prolongation of the foundation beams 11 are joined together by a longitudinal beam 21 which contacts the ground, holds the foundation beams in alignment and in parallelism and may be anchored to the ground by drive stakes 22, if desired.

Since some of the stringers and some of the foundation beams interlock with the vehicle body and since the stringers and foundation beams where they intersect are locked together, a rigid rectangular structure results which is anchored to and centrally supported and stiffened by the vehicle body.

I claim:

A portable bleacher including a vehicle body having side and end walls, said side walls being considerably longer than the end walls so that the vehicle is generally rectangular, one of said side walls being shorter than the other, a roof slanting downwardly from the longer side wall to the shorter side wall, said walls and roof being permanently and rigidly connected together to define a space suitable for use as a dressing room or the like, and for use in transporting the bleacher structure, a plurality of spaced and horizontally aligned openings in the shorter side wall, a plurality of spaced inclined foundation beams perpendicular to the longitudinal axis of the vehicle body, all of said foundation beams contacting the ground at their lower ends, some of said foundation beams being positioned in the openings in the vehicle side wall such that they are interlocked and supported by the vehicle body in general parallelism with the slanted roof of the body, the remaining foundation beams terminating in general alignment with the higher side wall and spaced laterally from an end wall of the vehicle, an adjustable ground contacting support for each foundation beam terminating in general alignment with the higher side wall, said ground contacting supports positioning said remaining foundation beams in general parallelism with the slanted roof, a plurality of spaced horizontal cross beams parallel with the longitudinal body axis and extending across and supported by the inclined foundation beams, a plurality of openings in the end walls, the openings in each end wall being spaced and being aligned in a direction generally parallel with the vehicle slanted roof, some of said cross beams being positioned in said openings such that they are interlocked and supported at one end by said vehicle body end walls, said cross beams all lying in a plane that is parallel to and slightly below said slanted roof, and a seat structure mounted on said cross beams and extending from the ground upwardly and terminating at the upper edge of the slanted roof, said slanted roof forming the upper portion of said seat structure, all of the beams used in forming said bleacher structure being of a length such that they are transportable within the vehicle body.

References Cited in the file of this patent

UNITED STATES PATENTS

| | | |
|---|---|---|
| 1,037,416 | Beverstock | Sept. 3, 1912 |
| 1,222,685 | Sellick | Apr. 17, 1917 |
| 1,301,107 | Curtis | Apr. 22, 1919 |
| 1,477,242 | Christopher | Dec. 11, 1923 |
| 2,061,465 | Hussey | Nov. 17, 1936 |
| 2,245,825 | Ross | June 17, 1941 |
| 2,587,159 | Holmes | Feb. 26, 1952 |
| 2,635,889 | Concello | Apr. 21, 1953 |
| 2,883,712 | Shelamer | Apr. 28, 1959 |

FOREIGN PATENTS

| | | |
|---|---|---|
| 420,668 | Italy | 1947 |
| 804,129 | Germany | Apr. 16, 1951 |
| 154,709 | Australia | 1954 |